United States Patent
Fogle

(10) Patent No.: US 6,434,837 B1
(45) Date of Patent: Aug. 20, 2002

(54) TWISTED TRIMMER LINE

(75) Inventor: John R. Fogle, Cave Creek, AZ (US)

(73) Assignee: Robert Philips, Scottsdale, AZ (US); a part interest ( * ) Notice: Subject to any disclaimer, the term of this patent is extended or adjusted under 35 U.S.C. 154(b) by 0 days.

(21) Appl. No.: 09/515,186

(22) Filed: Feb. 29, 2000

(51) Int. Cl.$^7$ .............................. B26B 9/02; D02G 3/00
(52) U.S. Cl. ............................ 30/347; 30/276; 428/399
(58) Field of Search ................... 30/276, 347; 428/399, 428/400; D8/8

(56) References Cited

U.S. PATENT DOCUMENTS

| | | | |
|---|---|---|---|
| 3,063,094 A | 11/1962 | Warthen | |
| 4,054,993 A | 10/1977 | Kamp | 30/276 |
| 4,186,239 A | 1/1980 | Mize | 428/399 |
| 5,220,774 A | 6/1993 | Harbeke | 56/12.7 |
| 5,687,482 A | 11/1997 | Behrendt | 30/276 |
| 5,761,816 A | 6/1998 | Morabit | 30/276 |
| 6,045,911 A | * | 4/2000 | Legrand et al. ............. 428/399 |

* cited by examiner

Primary Examiner—Hwei-Siu Payer
(74) Attorney, Agent, or Firm—LaValle D. Ptak

(57) ABSTRACT

A monofilament string trimmer line exhibiting reduced noise and reduced drag has a uniform oval cross section throughout its length. The monofilament line is spirally twisted about its longitudinal axis over at least a portion of its length to reduce noise production and drag.

19 Claims, 3 Drawing Sheets

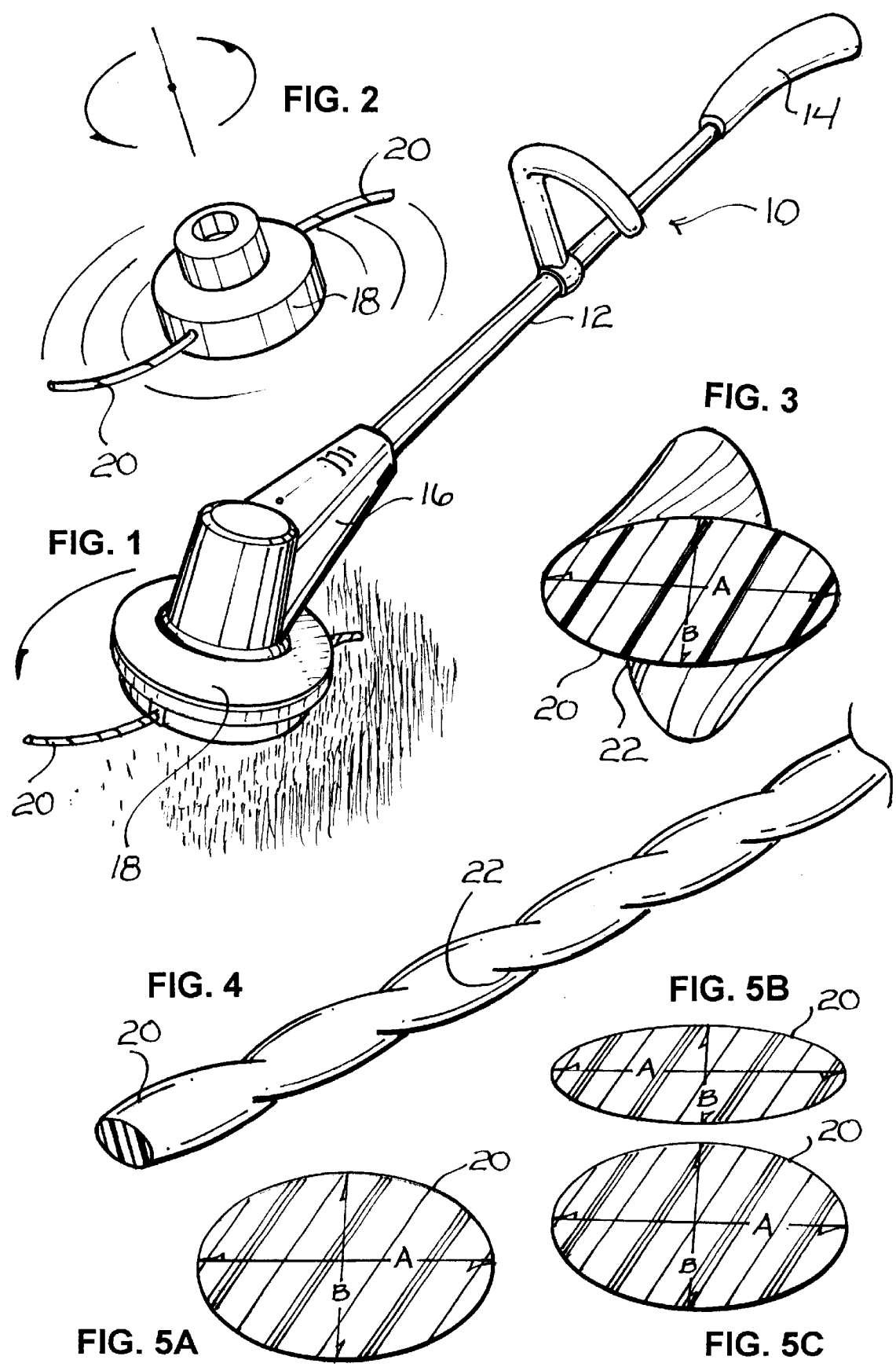

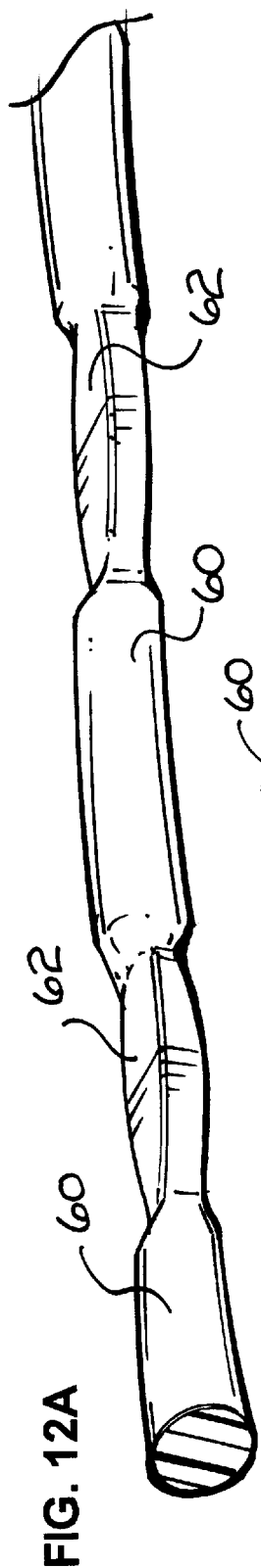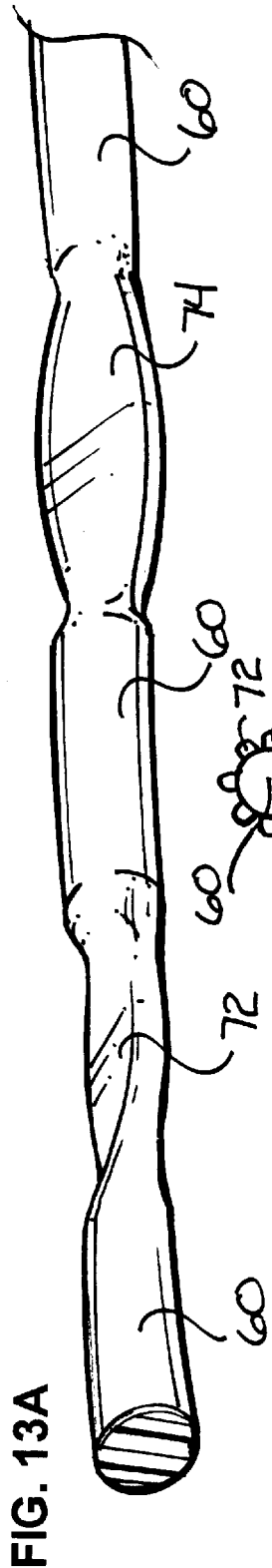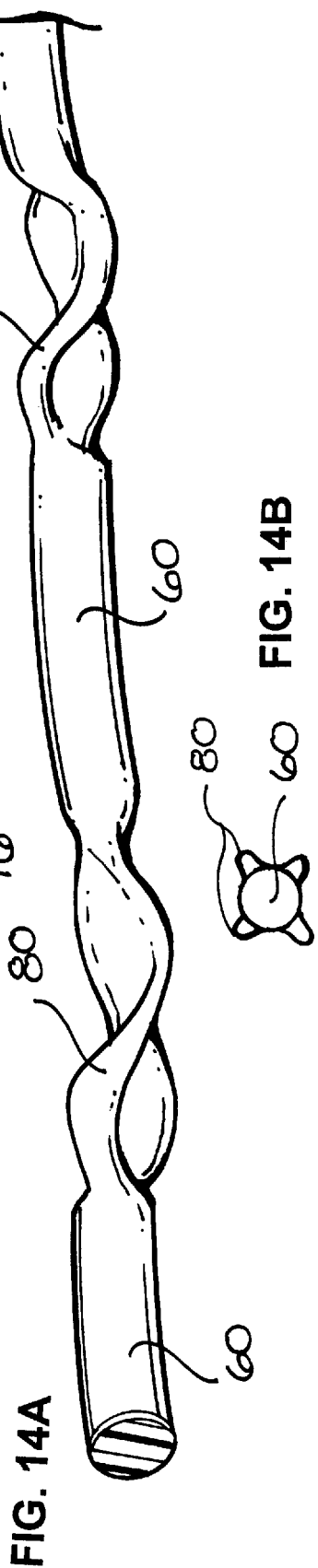

TWISTED TRIMMER LINE

BACKGROUND

Rotary string trimmers utilizing lengths of nylon monofilament line, or the like, are widely used for cutting weeds and other vegetation. Typically, the trimmer line which is used in such machines is extruded nylon monofilament, generally having a circular cross section. The cross-sectional diameter generally varies from 0.0050" for non-commercial or home use up to 0.155" for commercial use or heavy duty brush cutting. Typical rotational cutting speeds vary from approximately 2000 RPM (for large diameter line) to 20,000 RPM for smaller diameter line. At these high speeds of rotation, substantial wind noise is produced by the line, as well as significant drag. The drag on the engine causes greater fuel consumption for gasoline powered string trimmers, and results in higher electrical use for electric motor driven string trimmers.

Efforts have been made to provide discontinuities or distortions on the surface of string trimmer line; and such distortions have been found to reduce noise to some extent. The United States patent to Mize et al. U.S. Pat. No. 4,186,239 discloses a cutting filament made of nylon with a plurality of transverse notches on its surface. The notches are provided to prevent the nylon filament from fraying and fibrillating on the ends as it is used. The notches tend to define predetermined breaking edges at the free end of the cutting element.

The U.S. patents to Harbeke U.S. Pat. No. 5,220,774 and Warthen U.S. Pat. No. 3,063,094 both are directed to filaments which include spiral discontinuities extending along the length of the filaments. These discontinuities may be in the form of spiral grooves (as shown by both Warthen and Harbeke), or they may be in the form of a helical spiral protrusion, as disclosed in the Harbeke patent. As noted in the Harbeke patent, the utilization of these elongated spirals or grooves is believed to shed vortices in a non-periodic manner to reduce noise produced by the rotating filament. It also should be noted that if the helical discontinuity is formed by means of a spiral groove along the length of the filament, the cross-sectional area of the filament is reduced by the depth of the channel or discontinuity which is formed. On the other hand, if the discontinuity is an additional spiral rib on the surface of the string trimmer line, the overall diameter of the holes through which the line must pass on machines with which it is used needs to be greater than for conventional string trimmer line of comparable bulk.

The United States patent to Morabit et al. U.S. Pat. No. 5,761,816 is directed to the formation of an aerodynamic profile for the cross section of a string trimmer line. Many of the examples which are shown in this patent are somewhat complex in shape. The intent of these highly specialized cross-sectional shapes of string trimmer line, however, is to reduce the coefficient of drag as the line spins about the rotating hub of the trimmer machine when it is used.

The U.S. patent to Behrendt U.S. Pat. No. 5,687,482 is directed to a rotating trimming line which is stated to have reduced noise. The trimmer line disclosed in this patent has a square or rectangular cross section; and the line is twisted about its central axis in a continuous spiral. Thus, the four edges extend along the line in a helical configuration. Behrendt states that this twisting of the line causes the flow resistance to be diminished, the noise to be reduced, and the rotational speed of the tool to be increased, with the same performance. It further is stated in Behrendt that another advantage of the line is that its resistance to wear is not reduced by depressions or notches, such as is the case with rotation trimmer devices provided with grooves or stellate profiles.

The corner-to-corner distance across the square, the diagonal, can be no larger than opening utilized for standard circular lines (for example, 0.095"), in order for this line to be used with conventional string trimmer devices. The weight of the Behrendt line per unit of length for any given size then is less than conventional circular line. Thus, less bulk of line is available for impact in trimming vegetation; but the effectiveness of string trimmers is directly related to the mass of the line and the speed at which it is rotated.

It is desirable to provide a string trimmer line which produces low drag and reduced noise, which is simple and effective to manufacture, and which overcomes the disadvantages of the prior art devices.

SUMMARY OF THE INVENTION

It is an object of this invention to provide an improved string trimmer line.

It is another object of this invention to provide an improved low-noise string trimmer line.

It is an additional object of this invention to provide an improved low-noise string trimmer line which is simple to manufacture.

It is a further object of this invention to provide an improved low-noise string trimmer line having a generally oval shaped cross section, at least part of which is helically twisted about its longitudinal axis.

In accordance with a preferred embodiment of this invention, a string trimmer line consists of an elongated length of filament at least a portion of which has an oval cross section, with a generally centrally disposed longitudinal axis, and where at least a portion of the line is twisted about the centrally disposed axis.

BRIEF DESCRIPTION OF THE DRAWINGS

FIG. 1 is a perspective view illustrating a string trimmer machine of the type with which the line of the present invention may be used;

FIG. 2 is a top perspective diagrammatic view of a rotating string trimmer head of the type with which line of the invention may be used;

FIG. 3 is a cross-sectional view of a line in accordance with the preferred embodiment of the invention;

FIG. 4 is a perspective view of the line shown in FIG. 3;

FIGS. 5A, 5B and 5C illustrate alternative configurations for the line shown in FIGS. 3 and 4;

FIGS. 12A/12B, 13A/13B, and 14A/14B illustrate further alternative configurations for the line.

DETAILED DESCRIPTION

Figure 6:
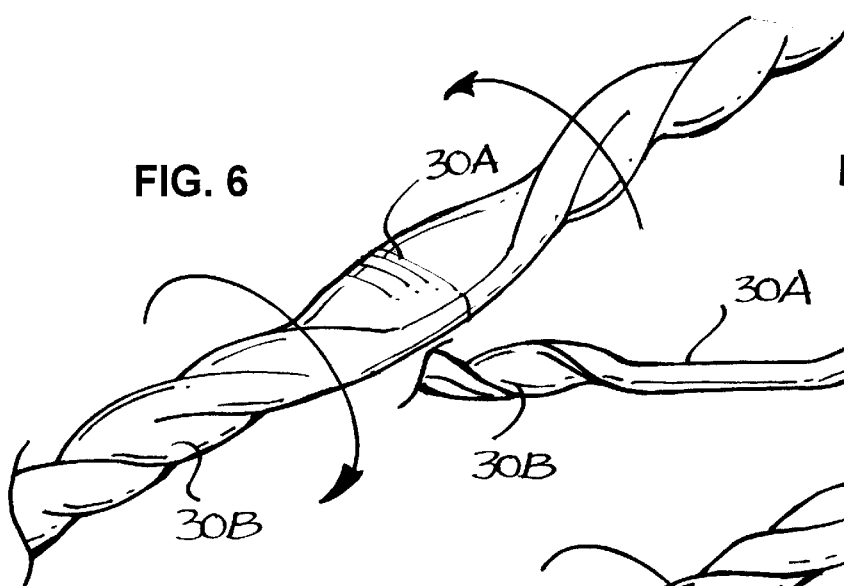
FIG. 6 is a top perspective view of a variation of the embodiment shown in FIG. 4.

As used in the following specification and claims, the term "oval" designates a continuous curve in the form of an ellipse or other oval configuration having a major axis and a perpendicular minor axis which is shorter than the major axis, and the term also includes elongated rectangles, air foil shapes and flattened ovals having a pair of parallel faces interconnected by curved ends, with all of these shapes having perpendicular intersecting major and minor axes where the major axis is greater than the minor axis.

Reference now should be made to the drawings, in which the same reference numbers are used throughout the different figures to designate the same or similar components. FIGS. 1 and 2 depict the general type of string trimmer machines with which a preferred embodiment of the invention is to be used. Such machines 10 typically include an elongated tubular portion 12 having an upper handle 14 and a lower motor 16. The machine rotates an operating head 18, out of which a single length or pair of lengths of string trimmer line 20 extend. The machine which is shown in FIG. 1 has a configuration generally used for electric string trimmers. When a gasoline powered string trimmer machine is used, the motor typically is located at the upper end 14 of the portion 12 and operates through a rotating shaft located within the portion 12 to rotate the head 18. In either event, the operation, so far as the trimmer string 20 is concerned, is the same. This operation is generally represented in FIG. 2, where the head 18 is rotated continuously in a circular direction (as shown by the arrows) to spin the extended lengths of trimmer string 20 for cutting vegetation.

Typically, the trimmer string 20 is made of extruded monofilament plastic or nylon line. Typical diameters range from 0.050" to 0.155". The rotational speed of the heads used in the trimmers of the type generally shown in FIG. 1 are between 2,000 to 20,000 RPMs. As a consequence, replacement of worn line continuously must be effected during operation of the trimmer. In addition, these high speeds result in a significant amount of noise produced by the spinning line itself.

In accordance with a preferred embodiment of this invention, it has been found that extrusion of the line 20, in a cross-sectional configuration in the shape of an oval, as defined above, and then imparting a permanent helical twist along the length of the line about its longitudinal central axis, results in improved operating characteristics. Such a line is shown in FIGS. 3 and 4 where the cross-sectional shape, taken transversely of the longitudinal axis, is an oval having a major axis A and a minor axis B. The line is modified following extrusion to impart a permanent helical twist along its length; so that concave portions 22, as illustrated in FIGS. 3 and 4, are formed along the length of the line. This twist may be a continuous twist or, as explained later, it may be discontinuous. FIGS. 3 and 4 illustrate a continuous twisting of the line; so that it can be produced in conventional manner (except with the additional twisting operation) and packaged in the same manner as conventional circular monofilament string trimmer line currently is packaged. The major axis A of the line shown in FIGS. 3 and 4 determines the overall size of the line, which can be substituted for circular diameter line of the conventional type.

FIGS. 5A, 5B and 5C show different proportional ratios of the major and minor cross-sectional dimensions A and B of the line 20, illustrating alternative proportional configurations which may be used for the line shown in FIGS. 3 and 4. It has been found that when line 20 having an oval cross-sectional configuration as shown in FIGS. 3 and 4, and which has imparted to it a continuous helical twist on the order of above 0.25 revolutions per inch, but preferably above one revolution per inch, is used in a conventional string trimmer machine, exceptional reductions in both drag and noise production occur. In order to accurately determine the efficiency of this unique line configuration as contrasted with other types of commercially available line, comparative tests on both an electric string trimmer machine and a gasoline powered string trimmer machine were made. For each set of tests which are shown in the following tables, the machine which was used was the same machine, but with different line types employed. In all cases, the line length was identical for each of the different line types. The tests were run utilizing standard circular line as the standard for comparison. This line is shown in each of the following tables in bold face, and is the standard for establishing the basic noise level, basic weight (1.00) and basic speed. This standard line has no line distortion, that is no twists, no slots, no grooves.

For the smallest line size, 0.080", the following results were found:

TABLE 1

LINE SIZE: .080"

HEAD TYPE: HASSLE II  
LINE LENGTH: 16.25"  
UNIT: CRAFTSMAN 5.5 AMP ELEC.  
DATE: SEPT. 9, 1999  
CUT PATH: 14.25"

| | LINE TYPE | DISTORT. #/IN. | RPM HEAD | ENGINE | CURRENT amps | NOISE dB | NOISE TO STD | LINE WT. grams | TO STD | SPEED TO STANDARD |
|---|---|---|---|---|---|---|---|---|---|---|
| 1 | OVAL (LRG) ST. | 0 | 5797 | N/A | 4.68 | 92.7 | 2.30 | 1.56 | 1.06 | −563 |
| 2 | SUFFIX - TWIST | 2 | 5890 | N/A | 4.68 | 84.1 | −6.30 | 1.46 | 0.99 | −470 |
| 3 | OVAL (SML) ST. | 0 | 5920 | N/A | 4.73 | 93 | 2.60 | 1.66 | 1.13 | −440 |
| 4 | CYCLONE | 0 | 6030 | N/A | 4.63 | 93 | 2.60 | 1.47 | 1.00 | −330 |
| 5 | DIAMOND SPIRAL | 1 | 6113 | N/A | 4.59 | 84.9 | −5.50 | 1.57 | 1.07 | −247 |
| 6 | GROOVED | 0 | 6118 | N/A | 4.55 | 92.1 | 1.70 | 1.39 | 0.95 | −242 |
| 7 | DIAMOND SPIRAL | 2 | 6255 | N/A | 4.57 | 84 | −6.40 | 1.60 | 1.09 | −105 |
| 8 | ROUND | 0 | 6360 | N/A | 4.48 | 90.4 | 0.00 | 1.47 | 1.00 | 0 |
| 9 | STIHL | 1 | 6375 | N/A | 4.53 | 88.8 | −1.60 | 1.46 | 0.99 | 15 |

TABLE 1-continued

LINE SIZE: .080"

| | | HEAD TYPE: HASSLE II<br>LINE LENGTH: 16.25" | | UNIT: CRAFTSMAN 5.5 AMP ELEC. | | | | DATE: SEPT. 9, 1999<br>CUT PATH: 14.25" | | |
|---|---|---|---|---|---|---|---|---|---|---|
| | LINE TYPE | DISTORT.<br>#/IN. | RPM<br>HEAD | ENGINE | CURRENT<br>amps | NOISE<br>dB | NOISE TO<br>STD | LINE WT.<br>grams | TO<br>STD | SPEED TO<br>STANDARD |
| 9 | GROOVED SPIRAL | 1 | 6411 | N/A | 4.41 | 84.9 | −5.50 | 1.39 | 0.95 | 51 |
| 10 | ROUND/SLOT | 0.5 | 6420 | N/A | 4.38 | 89.5 | −0.90 | 1.42 | 0.97 | 60 |
| 11 | ROUND/SLOT | 1.5 | 6446 | N/A | 4.4 | 90.3 | −0.10 | 1.42 | 0.97 | 86 |
| 12 | OVAL (SML) SPIRAL | 1 | 6490 | N/A | 4.34 | 86.7 | −3.70 | 1.51 | 1.03 | 130 |
| 13 | OVAL (LRG) SPIRAL | 1 | 6530 | N/A | 4.29 | 84.3 | −6.10 | 1.46 | 0.99 | 170 |

In the above table, the column which is labeled "DISTORT #/IN" indicates the number of twists, helical grooves or ribs formed in the particular line under consideration. The lines made according to the preferred embodiment of this invention constituted a continuous spiral, and are shown as line types 12 and 13 for small and large ovals, respectively. The small oval had a major cross-sectional dimension B which was 1.22× that of the minor cross-sectional dimension A. For the large oval, the major cross-sectional dimension B was 1.19× the minor cross-sectional dimension (A). The same oval lines, but without the spiral twisting in them, appear as line types 3 and 1, respectively, in the chart of Table 1. The line which is labeled "SUFFIX-TWIST" (line type 2 in Table 1) is constructed in accordance with the disclosure of patent U.S. Pat. No. 5,687,482 mentioned in the background portion of this specification. This line, as used in this test, was labeled as 0.095"; but it effectively is closer to a circular line of 0.080". For that reason, it is included as part of the test of Table 1.

As can be seen from an examination of Table 1, the oval spiral line made in accordance with the preferred embodiment of the invention exhibited significantly less noise compared with the standard line, and in addition provided increased speed (approximately 3%) at less current draw (approximately 4% less), thereby exhibiting less drag on the motor.

The line which is identified as line type 4 (Cyclone) is a generally circular line with longitudinally extending ribs on its surface. The diamond spiral line is a line having a diamond shape cross section which has been rotated or twisted in the amounts indicated in Table 1. The "Stihl®" line has a generally circular cross-sectional configuration with a helical groove cut along the length of the surface.

A comparative test, comparable to that provided in Table 1, also was conducted for a larger line size, namely 0.095" with the same line types being compared. All other parameters were the same. The results of this test are shown in Table 2 below:

TABLE 2

LINE SIZE: .095"

| | | HEAD TYPE: HASSLE II<br>LINE LENGTH: 16.25" | | UNIT: CRAFTSMAN 5.5 AMP ELEC. | | | | DATE: SEPT. 9, 1999<br>CUT PATH: 14.25" | | |
|---|---|---|---|---|---|---|---|---|---|---|
| | LINE TYPE | DISTORT.<br>#/IN. | RPM<br>HEAD | ENGINE | CURRENT<br>amps | NOISE<br>dB | NOISE TO<br>STD | LINE WT.<br>grams | TO<br>STD | SPEED TO<br>STANDARD |
| 1 | GROOVED | 0 | 5610 | N/A | 4.97 | 94 | −0.10 | 2.05 | 0.94 | −240 |
| 2 | OVAL (SML) ST. | 0 | 5660 | N/A | 4.91 | 94.4 | 0.30 | 2.20 | 1.01 | −190 |
| 3 | OVAL (LRG) ST. | 0 | 5685 | N/A | 4.82 | 94.3 | 0.20 | 2.22 | 1.02 | −165 |
| 4 | DIAMOND SPIRAL | 1 | 5715 | N/A | 4.87 | 83.1 | −11.00 | 2.30 | 1.06 | −135 |
| 5 | DIAMOND ST. | 0 | 5765 | N/A | 4.81 | 94.2 | 0.10 | 2.36 | 1.08 | −85 |
| 6 | ROUND | 0 | 5850 | N/A | 4.91 | 94.1 | 0.00 | 2.18 | 1.00 | 0 |
| 7 | ROUND/SLOT | 1 | 5900 | N/A | 4.81 | 87.5 | −6.60 | 2.20 | 1.01 | 50 |
| 8 | ROUND/SLOT | 1.5 | 5940 | N/A | 4.77 | 86.3 | −7.80 | 2.15 | 0.99 | 90 |

TABLE 2-continued

LINE SIZE: .095"

| | | HEAD TYPE: HASSLE II<br>LINE LENGTH: 16.25" | | UNIT: CRAFTSMAN 5.5 AMP ELEC. | | | | DATE: SEPT. 9, 1999<br>CUT PATH: 14.25" | | |
|---|---|---|---|---|---|---|---|---|---|---|
| | LINE TYPE | DISTORT.<br>#/IN. | RPM<br>HEAD | ENGINE | CURRENT<br>amps | NOISE<br>dB | NOISE TO<br>STD | LINE WT.<br>grams | TO<br>STD | SPEED TO<br>STANDARD |
| 9 | ROUND/SLOT | 0.5 | 5980 | N/A | 4.79 | 92.9 | −1.20 | 2.20 | 1.01 | 130 |
| 10 | HUSQ.-INDENT | | 5990 | N/A | 4.69 | 87.8 | −6.30 | 2.18 | 1.00 | 140 |
| 11 | GROOVED SPIRAL | 1 | 6030 | N/A | 4.66 | 84.8 | −9.30 | 2.10 | 0.96 | 180 |
| 12 | OVAL (SML) SPIRAL | 1 | 6160 | N/A | 4.63 | 87.6 | −6.50 | 2.18 | 1.00 | 310 |
| 13 | STIHL SLOT | 1 | 6220 | N/A | 4.58 | 84.4 | −9.70 | 2.05 | 0.94 | 370 |
| 14 | OVAL (LRG) SPIRAL | 1 | 6230 | N/A | 4.53 | 87 | −7.10 | 2.18 | 1.00 | 380 |

Once again, significantly improved results are shown to be achieved by the utilization of the spiral oval (Line types 12 and 14 of Table 2), with the large oval spiral once again exhibiting the most improved overall characteristics in reduced drag and a significant improvement in the noise reduction achieved.

Additional tests using a gasoline powered string trimmer machine were conducted, and produced, for line size 0.095" the results listed below in Table 3:

that the large oval spiral exhibited superior test characteristics in both the reduction of noise and improved speed when compared to the standard (namely, less drag).

The string trimmer machine which was employed in conducting the test of Table 3 also was operated with a larger line size, 0.130"; and the results of this test are shown in Table 4.

TABLE 3

LINE SIZE: .095"

| | | HEAD TYPE: HASSLE II<br>LINE LENGTH: 16.25" | | UNIT: CRAFTSMAN 21 cc ST. SHAFT | | | | DATE: SEPT. 9, 1999<br>CUT PATH: 14.25" | | |
|---|---|---|---|---|---|---|---|---|---|---|
| | LINE TYPE | DISTORT.<br>#/IN. | RPM<br>HEAD | ENGINE | CURRENT<br>amps | NOISE<br>dB | NOISE TO<br>STD | LINE WT.<br>grams | TO<br>STD | SPEED TO<br>STANDARD |
| 1 | DIAMOND - ST. | 0 | 5500 | 6400 | N/A | 94.2 | −2.30 | 2.30 | 1.06 | −1080 |
| 2 | OVAL (LRG) - ST. | 0 | 5800 | 6600 | N/A | 94.0 | −2.50 | 2.22 | 1.02 | −780 |
| 3 | DIAMOND SPIRAL | 1 | 5900 | 6600 | N/A | 89.5 | −7.00 | 2.36 | 1.08 | −680 |
| 4 | OVAL (SML) - ST. | 0 | 6270 | 7000 | N/A | 96.4 | −0.10 | 2.20 | 1.01 | −310 |
| 5 | GROOVED - ST. | 0 | 6300 | 7100 | N/A | 95.7 | −0.80 | 2.05 | 0.94 | −280 |
| 6 | OVAL (SML) SPIRAL | 1 | 6480 | 7200 | N/A | 92.7 | −3.80 | 2.18 | 1.00 | −100 |
| 7 | ROUND/SLOT | 1.5 | 6480 | 7300 | N/A | 90.0 | −6.50 | 2.15 | 0.99 | −100 |
| 8 | ROUND/SLOT | 1 | 6550 | 7400 | N/A | 91.7 | −4.80 | 2.20 | 1.01 | −30 |
| 9 | GROOVED SPIRAL | 1 | 6550 | 7400 | N/A | 91.7 | −4.80 | 2.10 | 0.96 | −30 |
| 10 | ROUND/FLAT | 0.5 | 6570 | 7400 | N/A | 96.0 | −0.50 | 2.20 | 1.01 | −10 |
| 11 | ROUND | 0 | 6580 | 7400 | N/A | 96.5 | 0.00 | 2.18 | 1.00 | 0 |
| 12 | HUSQ. INDENT | | 6600 | 7400 | N/A | 93.7 | −2.80 | 2.18 | 1.00 | 20 |
| 13 | OVAL (LRG) SPIRAL | 1 | 6650 | 7500 | N/A | 92.5 | −4.00 | 2.18 | 1.00 | 70 |
| 14 | STIHL QUIET | 1 | 6940 | 7700 | N/A | 90.3 | −6.20 | 2.05 | 0.94 | 360 |

In the tests of Table 3, line types 12, for Husqvarna® indented, and 14, Stihl®, are lines having generally circular cross-sectional configurations. For the "Stihl® quiet" line, the distortions per inch are in the form of a helical groove cut along the length of the surface. Once again, it can be seen

TABLE 4

LINE SIZE: .130"

HEAD TYPE: HASSLE I  
LINE LENGTH: 16.25"  
UNIT: CRAFTSMAN 21 cc ST. SHAFT  
DATE: SEPT. 9, 1999  
CUT PATH: 14.25"

| | LINE TYPE | DISTORT. #/IN. | RPM HEAD | ENGINE | CURRENT amps | NOISE dB | NOISE TO STD | LINE WT. grams | TO STD | SPEED TO STANDARD |
|---|---|---|---|---|---|---|---|---|---|---|
| 1 | OVAL (LRG) STR. | 0 | 5600 | 6300 | N/A | 96.5 | −1.70 | 3.92 | 0.98 | −400 |
| 2 | SUFFIX TWIST | 2 | 5700 | 6400 | N/A | 88.6 | −9.60 | 4.19 | 1.05 | −300 |
| 3 | CYCLONE STR. | 0 | 5840 | 6500 | N/A | 96.9 | −1.30 | 4.01 | 1.01 | −160 |
| 4 | GROOVED STR. | 0 | 5940 | 6700 | N/A | 96.0 | −2.20 | 3.61 | 0.91 | −60 |
| 5 | ROUND | 0 | 6000 | 6700 | N/A | 98.2 | 0.00 | 3.98 | 1.00 | 0 |
| 6 | ROUND/SLOT | 1 | 6000 | 6800 | N/A | 91.7 | −6.50 | 3.96 | 0.99 | 0 |
| 7 | ROUND/SLOT | 2 | 6000 | 6800 | N/A | 90.1 | −8.10 | 3.88 | 0.97 | 0 |
| 8 | CYCLONE SPIRAL | 1 | 6030 | 6800 | N/A | 90.2 | −8.00 | 4.16 | 1.05 | 30 |
| 9 | ROUND/SLOT | 0.5 | 6250 | 7000 | N/A | 97.0 | −1.20 | 3.83 | 0.96 | 250 |
| 10 | OVAL (LRG) SPIRAL | 1 | 6250 | 7100 | N/A | 92.4 | −5.80 | 3.84 | 0.96 | 250 |
| 11 | GROOVED SPIRAL | 1 | 6380 | 7200 | N/A | 90.3 | −7.90 | 3.69 | 0.93 | 380 |

Once again, the large oval spiral (Line type 10 in Table 4) exhibited significantly improved operating characteristics over the standard round line. In the test of Table 4, the line type No. 2 "SUFFIX TWIST" has a cross-sectional configuration of the type shown in patent U.S. Pat. No. 5,687,482. This line, while it was operated in the line size test for 0.130" is sized as 0.155". As with the other tests, Line type 10, in the form of a large oval spiral of the type described above and shown in FIGS. 3 and 4, exhibited significantly improved operating characteristics in noise reduction and lower drag (resulting in increased operating speeds).

As shown in FIGS. 5A, 5B and 5C, the cross section of typical ovals which may be employed with the line described above may vary in aspect ratio from the line of FIG. 5A, wherein the major axis "A" is only slightly greater than the minor axis "B", to a configuration shown in FIG. 5B where the major axis "A" is considerably greater than the minor axis "B", and with FIG. 5 representing a cross section of an oval having aspect ratios between the major axis "A" and minor axis "B" which is between that of FIGS. 5A and 5B. A noise study of the variation of different ratios of the type shown in FIGS. 5A, 5B and 5C, with different numbers of twists per inch to determine the effect of noise reduction, has been made; and the results of such a study are shown in the following Table 5:

TABLE 5

NOISE STUDY  
LINE OVALITY AND TWISTS

HIGH WHEELED "DR." TRIMMER

| | TWISTS PER INCH | | | | | | | | | |
|---|---|---|---|---|---|---|---|---|---|---|
| LINE CONFIG. | 0.00 dB | 0.25 dB | 0.50 dB | 1.00 dB | SIZE (inches) | HEAD HASSLE II | MACHINE "DR." 6 hp | HEAD SPEED (rpm) | LINE LENGTH (inches) | LINE SIZE (ACTUAL) (inches) |
| ROUND 1 × 1 | 99.40 | | | | 0.155" | DESERT II | "DR." 6 hp | 3400 | 21" | 0.145" × 0.156" |
| OVAL 1 × 1.25 | | 99.10 | 96.20 | 90.90 | 0.155" | DESERT II | "DR." 6 hp | 3400 | 21" | 0.133" × 0.186" |
| OVAL 1 × 1.43 | | 100.50 | 98.00 | 91.20 | 0.155" | DESERT II | "DR." 6 hp | 3400 | 21" | 0.133" × 0.180" |
| OVAL 1 × 2.00 | | 94.60 | 92.30 | 90.50 | 0.155" | DESERT II | "DR." 6 hp | 3400 | 21" | 0.115" × 0.208" |

HAND HELD 31 cc GAS TRIMMER

| | TWISTS PER INCH | | | | | | | | | |
|---|---|---|---|---|---|---|---|---|---|---|
| LINE CONFIG. | 0.00 dB | 0.50 dB | 1.00 dB | 1.50 dB | SIZE (inches) | HEAD HASSLE II | MACHINE BC 3100 | HEAD SPEED (rpm) | LINE LENGTH (inches) | LINE SIZE (ACTUAL) (inches) |
| ROUND 1 × 1 | 100.60 | | | | 0.130" | DESERT II | BC 3100 | n/a | 16¼" | 0.125" × 0.135" |
| OVAL 1 × 1.25 | | 97.80 | 93.10 | 93.80 | 0.130" | DESERT II | BC 3100 | n/a | 16¼" | 0.110" × 0.147" |
| OVAL 1 × 1.43 | | 96.90 | 94.50 | 92.90 | 0.130" | DESERT II | BC 3100 | n/a | 16¼" | 0.112" × 0.150" |
| OVAL 1 × 2.00 | | 96.00 | 93.70 | 93.60 | 0.130" | DESERT II | BC 3100 | n/a | 16¼" | 0.100" × 0.173" |

As the number of twists increased, the noise level decreased. For each different shape and cross-sectional size, the optimum number of twists per inch can be determined (empirically or by calculation) to achieve effective noise reduction and drag reduction.

It further has been found that the utilization of the oval spiral twisted line can be implemented with continuous lengths of line having non-twisted segments between twisted segments, as well as being utilized for cut lengths of line having a non-twisted section at the midpoint. The provision of non-twisted sections at predetermined intervals along the length of the line has obvious advantages. Persons desiring to remove a fixed length of line from a large capacity storage spool, simply can count the desired number of non-twisted areas and accurately cut off the desired length of line to be used with bump-and-feed string trimmers or the like. For string trimmers which utilize cut lengths of line, placing a non-twisted portion at the midpoint of the cut length and then twisting the remainder of the line on opposite sides of the central point allows the user to replace the line accurately in a fixed line head, by locating the center portion which is not twisted.

Figure 7:
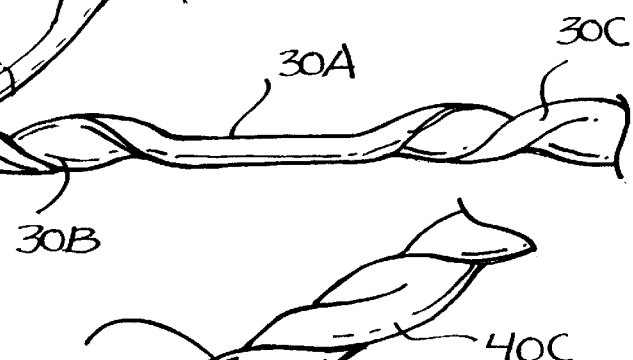
FIG. 7 is a side view of a section of the line shown in FIG. 6.

FIG. 6 shows such a configuration of a line which may be used either for a fixed length line or a continuous line having predetermined non-twisted spots throughout its length. As shown in FIG. 6, a line has a non-twisted portion 30A located in it, with the portions on opposite sides of it twisted in opposite directions, namely the portion 30D being twisted counterclockwise and the portion 30C being twisted clockwise from the opposite end on the right-hand side of the flat portion 30A. FIG. 7 is a side view of this same line shown in FIG. 6.

Figure 8:
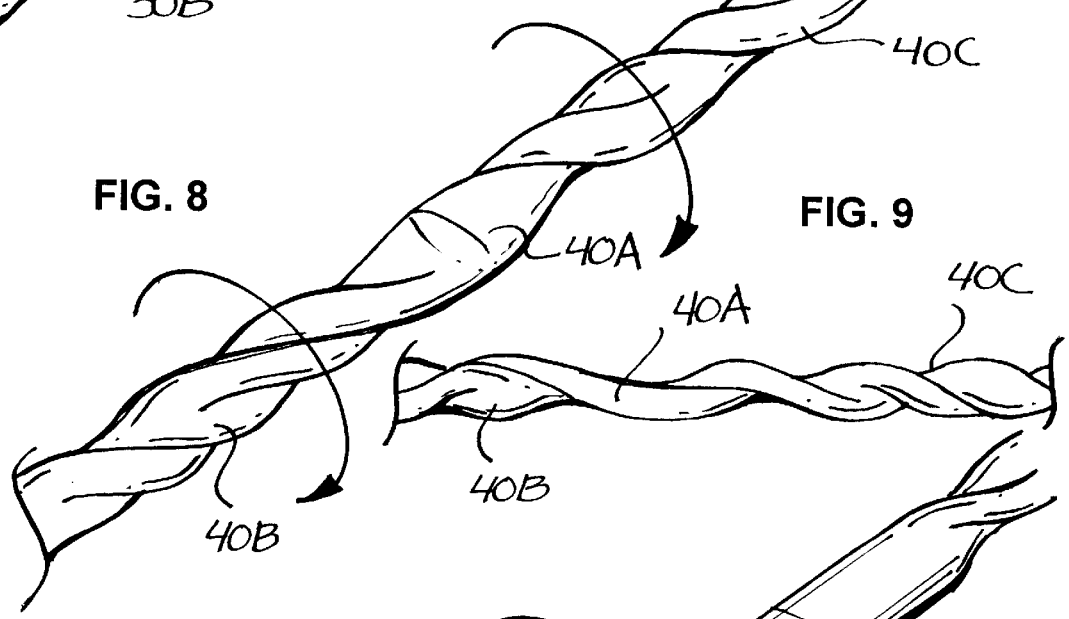
FIG. 8 is a perspective view of another variation of the line shown in FIG. 4.
Figure 9:
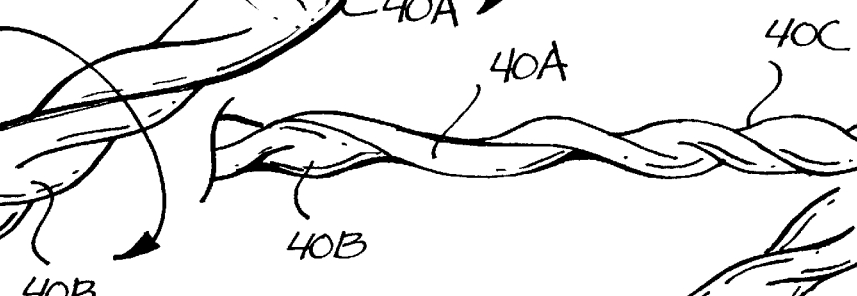
FIG. 9 is a side view of a section of the line shown in FIG. 8.

FIGS. 8 and 9 are directed to an embodiment which is similar to the one shown in FIGS. 6 and 7, but in which the line is twisted in the same direction on opposite sides of the untwisted central portion 40A, with the sections 40B and 40C comprising twisted sections extending on either side of the central portion 40A. It should be noted that the lines shown in FIGS. 6 through 9 can be either continuous lengths of line with non-twisted sections, such as 30A and 40A, in them at periodic intervals, or may be directed to fixed lengths of line where the sections 30A and 40A comprise the center of the cut length or fixed section.

Figure 10:
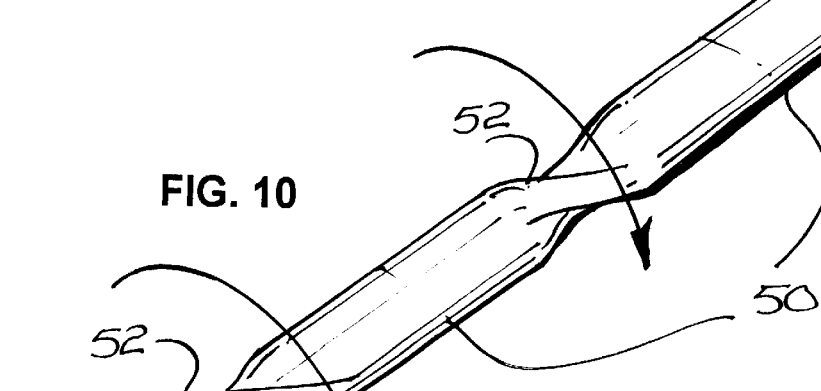
FIG. 10 is a perspective view of another variation of the line in accordance with a preferred embodiment of the invention.
Figure 11:
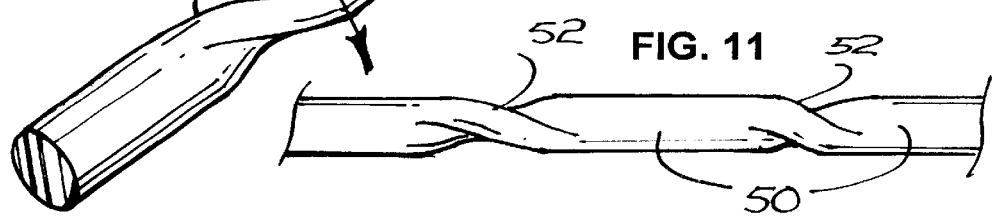
FIG. 11 is a side view of a portion of the line shown in FIG. 10.

FIGS. 10 and 11 illustrate yet another embodiment of the invention showing full twists 52 located at periodic intervals between non-twisted sections 50 on an elongated section of line. This line also may be substituted for the line described above in conjunction with FIGS. 3 and 4, and it may be utilized in the various tests which have been operated and disclosed in Tables 1 through 4. It has been found that the configuration shown in FIGS. 10 and 11 provides results similar to those seen in Tables 1 through 4 for the oval spiral line when the non-twisted portion 50, located between the twisted sections 52, is approximately 1" or less.

FIGS. 12A/12B, 13A/13B, and 14A/14B illustrate variations of oval line configurations which also may be used in addition to the cross-sectional line configurations which have been discussed above. FIG. 12A is a perspective view of a line which is formed from a basic circular stock having intermittent circular sections 60 which are interconnected by flattened (having oval cross sections)portions 62. FIG. 12B is an end view of the line. The line of FIGS. 12A/12B functions to provide reduced drag and reduced noise comparable to the effects noted above for the lines shown in FIGS. 1 through 11.

FIGS. 13A/13B are directed to a variation of the line shown in FIGS. 12A/12B, where circular intermittent sections 60 of the line are interconnected or spaced by four flattened oval sections 72, 74, 76 and 78, each rotated relative to the preceding by 45° to produce the end view shown in FIG. 13B. The overall effect of the line of FIGS. 13A/13B is comparable to the line shown in FIG. 4 for a continuous twisted oval; and the oval rotation or twist effected by the segments 72, 74, 76 and 78 produces an overall reduction in noise and drag comparable to that of the line shown in FIG. 4.

FIGS. 14A/14B are directed to a variation of the line shown in FIGS. 12A/12B in which circular sections 60 of the line are interconnected by twisted, flattened oval portions 80 to form the line configuration illustrated in these figures. Once again, the overall effect is comparable to that which has been described above for the embodiments of FIGS. 1 through 11.

The foregoing description of the preferred embodiment of the invention is to be considered as illustrative and not as limiting. Various changes and modifications will occur to those skilled in the art for performing substantially the same function, in substantially the same way, to achieve substantially the same result without departing from the true scope of the invention as defined in the appended claims.

What is claimed is:

1. A string trimmer line including:
   an elongated fixed length of a filament member having an oval cross section with a major cross section dimension "A" and a minor cross section dimension "B", and having a generally centrally disposed longitudinal axis, with a non-twisted center section, and wherein at least a portion of the filament member on each side of the center section is rotated relative to other portions of the filament member about the centrally disposed axis with a twist uniform in pitch throughout the length of the portions which are twisted.

2. The string trimmer line according to claim 1 wherein the twists on both sides of the non-twisted center section are in the same direction.

3. The string trimmer line according to claim 1 wherein the twists on the opposite sides of the non-twisted center section are in opposite directions.

4. A string trimmer line including:
   an elongated length of a filament member having an oval cross section with a major cross section dimension "A" and a minor cross section dimension "B", and having a generally centrally disposed longitudinal axis, wherein at least a portion of the filament member is rotated relative to other portions of the filament member about the centrally disposed axis to form a plurality of non-rotated portions interconnected by rotated portions throughout its length.

5. The string trimmer line according to claim 4 wherein the elongated filament member is made of plastic material.

6. A string trimmer line including:
   an elongated length of a filament member having an oval cross section with a major cross section dimension "A" which is at least about 15% greater than a minor cross section dimension "B", and having a generally centrally disposed longitudinal axis, wherein at least a portion of the filament member is rotated relative to other portions of the filament member about the centrally disposed axis.

7. A string trimmer line including:
   an elongated length of a filament member having an oval cross section with a major cross section dimension "A" and a minor cross section dimension "B", and having a generally centrally disposed longitudinal axis, wherein at least a portion of the filament member is rotated relative to other portions of the filament member about the centrally disposed axis; wherein each cross section of the filament member perpendicular to the axis thereof is uniform throughout the length thereof, but is angularly displaced by a constant amount along the longitudinal axis thereof.

8. The string trimmer line according to claim 7 wherein the filament member is rotated about the centrally disposed axis thereof with at least one twist per inch of length.

9. A string trimmer line including:
an elongated length of a filament member having an oval cross section with a major cross section dimension "A" and a minor cross section dimension "B", and having a generally centrally disposed longitudinal axis, wherein at least a portion of the filament member is rotated relative to other portions of the filament member about the centrally disposed axis; wherein the rotation of the filament member is uniform in pitch throughout the length of the portion which is rotated.

10. The string trimmer line according to claim 9 wherein the elongated filament member is made of plastic material.

11. The string trimmer line according to claim 10 wherein the rotation in the filament member comprises a substantially helical twist.

12. The string trimmer line according to claim 11 wherein each cross section of the filament member perpendicular to the axis thereof is uniform throughout the length thereof, but is angularly displaced by a constant amount along the longitudinal axis thereof.

13. The string trimmer line according to claim 12 wherein the filament member is twisted about the centrally disposed axis thereof with approximately one twist per inch of length.

14. The string trimmer line according to claim 13 wherein the major cross section dimension A is at least about 15% greater than the minor cross section dimension B.

15. The string trimmer line according to claim 14 wherein the oval cross section of said filament member is an elliptical cross section.

16. The string trimmer line according to claim 15 wherein the filament member is made of nylon monofilament material.

17. The string trimmer line according to claim 9 wherein the filament member is made of nylon monofilament material.

18. The string trimmer line according to claim 9 wherein the rotation in the filament member comprises a substantially helical twist.

19. The string trimmer line according to claim 18 wherein the twist of the filament member is uniform in pitch throughout the length of the portion which is twisted.

\* \* \* \* \*